United States Patent [15] 3,655,443
Campbell [45] Apr. 11, 1972

[54] PROCESS FOR MAKING A BATTERMIX STARCH FOR BREADED DEEP FRIED FOODS

[72] Inventor: Charles S. Campbell, Hammond, Ind.
[73] Assignee: American Maize Products Company
[22] Filed: Dec. 10, 1969
[21] Appl. No.: 884,052

[52] U.S. Cl.......................................127/70, 99/1, 99/107, 106/210, 127/32
[51] Int. Cl. .......................................................C13l 1/08
[58] Field of Search ....................127/32, 33, 70, 71; 106/210

[56] References Cited

UNITED STATES PATENTS 3,208,851 9/1965 Antinori .......................................99/1
3,317,346 5/1967 Kibbel .......................................127/70

OTHER PUBLICATIONS

J. W. Pence et al., Cereal Chem., 36(3), 199–214 (1959).

Primary Examiner—Morris O. Wolk
Assistant Examiner—Sidney Marantz
Attorney—Eyre, Mann & Lucas

[57] ABSTRACT

A battermix starch having consistently high adhesion characteristics and a process for making the same are disclosed. The protein content of a commercial starch is adjusted to 0.7 percent or more by weight of the starch and the high protein starch is then modified by oxidative treatment.

6 Claims, No Drawings

PROCESS FOR MAKING A BATTERMIX STARCH FOR BREADED DEEP FRIED FOODS

The present invention relates to a new and improved starch for a deep fat fried food batter which has superior adhesion to foodstuffs and which imparts superior adhesion to breading is such is used.

The ideal batter is one which consistently displays such adhesive power that the breaded batter coating is an integral part of the foodstuff. Until the discovery of the unique battermix starch of the present invention, it has never been possible to consistently produce such batter.

For years, the base ingredients in deep fried foods batters have been starches and cereal flours. Although various attempts have been made to improve them, none of the flours or starches have a consistently high degree of adhesion. The selection of particular starch lots has given somewhat better adhesion, but this method is costly. Ingredients such as egg solids, milk solids and vegetable gums have been added but these are expensive and the results are not consistent. Functional starches mildly inhibited by cross linking have been tried as well as lightly treated acid thin boiling starches, but these have not been entirely satisfactory and were not well accepted in the trade. Mild oxidation of the starch has also been tried. This requires treatment in a certain pH range with active chemical oxidant. The pH must be very carefully controlled within a narrow range, usually 5.8–6.3, and the chemical oxidant must be present only in the very limited range of 0.25 to 0.5 percent by weight of starch. Even with these carefully controlled conditions, there is no consistency in the finished product and it is necessary to test each batch to determine its adhesive characteristics.

We have surprisingly discovered that if the starch which is oxidized has a high protein content, it will consistently produce a batter starch having superior adhesion characteristics and it is not necessary to follow the stringent conditions heretofore required for oxidation of the starch. The normal level of protein in commercial starch is 0.2 to 0.4 percent by weight. We have discovered that if the protein level is adjusted to about 0.7 percent or more by weight of starch, the starch can be oxidized in a pH range anywhere from 2 to 10 and with an active chemical oxidant range of 0.2 through 20 percent by weight of starch or higher and the resulting batter will have consistently good adhesion characteristics.

The present invention may be used to advantage whenever it is desired to coat a foodstuff with a breading mix. The term breading mix will be understood by those skilled in the art to mean any mix which is applied to foodstuffs before deep fat frying. Such mixes include bread crumbs, cookie crumbs, cracker crumbs and the like either alone or mixed with butter, salt, seasoning, etc. The term foodstuff means any food which can be deep fried, such as meats, fish, shell fish, fowl, vegetables, etc.

The protein used to adjust the protein level of the starch can be of either animal or vegetable origin. As a general rule, however, we prefer to use a protein derived from the same material as the starch, e.g. we add corn protein to corn starch. Normal commercial starches have a protein level of approximately 0.2 to 0.4 percent and it is necessary to adjust this level to about 0.7 percent protein by weight starch or higher. This adjustment in the protein level of the starch can be made by any suitable method. One suitable method is the simple addition of protein. As stated above, the protein to be added can be of either animal or vegetable origin. A second suitable method to adjust the protein content is to combine a starch with a high protein content with one which has a low protein content such that the resulting mixture has the desired protein level. A third method, and the method which we prefer, is especially applicable to corn starch. Corn starch is commercially prepared by separating the starch from the gluten. Since gluten is primarily protein, a high protein starch can be made simply by reducing the amount of gluten that is normally removed. Numerous other methods to adjust the protein level can also be employed and the examples given hereinabove are only intended to be illustrative.

Any starch in which the protein level has been adjusted to about 0.7 percent or higher can successfully be employed in the present invention. However, we prefer a range of 0.7 to 11 percent. A protein level in the starch which is below 0.7 percent does not give consistently good results. Protein levels above 11 percent are still effective but the amount of oxidant required is then quite high. High oxidant content naturally means high costs; and higher oxidant content is also disadvantageous because it gels the product and makes it very difficult to manage the product without extensive use of alcohols or other comparable diluents.

Oxidizing materials which can be used in practicing the present invention include the edible non-toxic oxidizing agents such as hypochlorite, peroxide, peracetic acid, persulfate, chlorite, and permanganate. The preferred oxidizing agents are chlorine compounds, e.g. hypochlorous acid and sodium hypochlorite. The amount of chlorine to be added can be readily determined by one skilled in the art. As a general rule, however, there is a relationship between the protein present and the amount of chlorine used. Optimum adhesion and best results are achieved when the ratio of active chlorine to protein is at least 0.2:1 and preferably not over 2.5:1.

The pH during oxidative treatment of the starch may be anywhere in the range from 2 to 10. Existing methods of inhibiting starches by oxidation require acid conditions, generally in the range of 5.8 through 6.3. Not only does the high protein starch broaden the useable pH range on the acid side, but it also permits the reaction to be carried out under basic conditions. Although excellent adhesion is obtained throughout this wide pH range, we prefer a pH range of 5 to 9, especially when the oxidizing material chosen is a hypochlorite. Hypochlorite oxidations conducted below a pH of 5 liberate considerable amounts of chlorine gas and hypochlorite oxidations conducted above a pH of 9 yield products with a somewhat darker color.

The modification of starch by oxidation is a well known reaction to those skilled in the art and may be done by a number of different methods, including both wet and dry reactions. We prefer the following method: A quantity of "high protein" corn starch is slurried with an approximately equal amount of water. The oxidizing agent is then added and the reaction is allowed to continue at ambient temperatures for 1 to 20 hours with agitation. The excess oxidizing agent is then removed or inactivated, e.g. by the addition of a product such as sodium bisulphite. The pH of the reaction is generally controlled between about 2 and about 10.

These and other advantages of the present invention may be more fully understood by the following illustrative examples:

EXAMPLE 1

200 grams of normal commercial corn starch (protein content 0.3 percent) was slurried in 225 cc of tap water at a temperature of about 70° F. The density of the slurry was adjusted to 23° to 24° Baume by the addition of water. Filleted codfish portions of approximately 3 to 4 ounces in size were thoroughly dipped in the starch batter slurry, drained and then quickly breaded with breading mix. The breaded fillet was immersed into a deep fat fry bath with an oil temperature of 375° to 380° F. and was fried until it floated. The fried fillet was drained, and the adhesion of the batter to the codfish was tested by scraping a fork lightly along the four sides of the fillet. The percent of the battermix which adhered to the fish was only 45 percent.

EXAMPLE 2

Corn protein was added to commercial corn starch to raise the protein content of the starch to 0.8 percent by weight. The starch was then tested as a battermix base by the procedure of Example 1. The percent batter adhesion was 50 percent.

EXAMPLE 3

Example 2 was repeated but the high protein starch was oxidized in conventional manner with 0.3 percent hypochlorous acid by weight of starch. The modified starch was tested as a battermix base by the procedure of Example 1. The percent batter adhesion was 90 percent.

EXAMPLES 4 and 5

Example 3 was repeated with the starch oxidized at levels of 0.6 and 0.9 percent active chlorine. The percent batter adhesion was 100 percent and 80 percent respectively. The results of Examples 1 through 5 are summarized in Table 1 below:

TABLE I

| Example No. | % Protein | Chlorine Treatment Level (% Active Chlorine) | % Batter Adhesion |
| --- | --- | --- | --- |
| 1 | 0.38 | 0.0 | 45 |
| 2 | 0.8 | 0.0 | 50 |
| 3 | 0.8 | 0.3 | 90 |
| 4 | 0.8 | 0.6 | 100 |
| 5 | 0.8 | 0.9 | 80 |

Examples 1 through 5 show results which are comparable to what is obtained in commercial production. Contrary to the non-consistent results obtained with unoxidized normal commercial starch, the oxidized high protein starch consistently yields a batter starch which gives a high degree of batter adhesion.

EXAMPLE 6

In this example, a high protein corn starch was mixed with standard starch to raise the protein content to 1.25 percent by weight of starch. The starch was then tested as a battermix base by the procedure of Example 1. The percent batter adhesion was 50 percent.

EXAMPLES 7–13

Starch with a protein level of 1.25 percent was treated with levels of active oxidant from 0.3 to 2.1 percent by weight of starch in a series of tests as in Examples 3 through 5. The percent batter adhesion was tested by the procedure of Example 1. The results of the tests of Examples 6 through 13 are summarized in Table II below:

TABLE II

| Example No. | % Protein | Chlorine Treatment Level (% Active Chlorine) | % Batter Adhesion |
| --- | --- | --- | --- |
| 6 | 1.25 | 0.0 | 50 |
| 7 | 1.25 | 0.3 | 90 |
| 8 | 1.25 | 0.6 | 100 |
| 9 | 1.25 | 0.9 | 100 |
| 10 | 1.25 | 1.2 | 100 |
| 11 | 1.25 | 1.5 | 95 |
| 12 | 1.25 | 1.8 | 95 |
| 13 | 1.25 | 2.1 | 80 |

EXAMPLES 14–18

Further tests were conducted with varying levels of protein in the starch and at various oxidation levels with oxidation carried out in the conventional manner to show the wide range through which the treatment is effective. In these examples the protein level of the starch was adjusted by various means and oxidation was carried out in conventional manner. The results of these tests, which were conducted according to the procedure set forth in Example 1, are summarized in Table III below:

TABLE III

| Example No. | % Protein | Chlorine Treatment Level (% Active Chlorine) | % Batter Adhesion |
| --- | --- | --- | --- |
| 14 | 1.25 | 1.0 | 100 |
| 15 | 4.0 | 3.0 | 100 |
| 16 | 4.0 | 6.0 | 100 |
| 17 | 11.0 | 8.0 | 95 |
| 18 | 11.0 | 16.0 | 100 |

In the above examples the pH was controlled within a range of 5.8 to 6.3 However, it is not necessary to control the pH within this narrow range; the oxidation may be carried out with excellent results at any pH between 7.0 and 11.0.

Tests were conducted in accordance with the procedure set forth in Example 1 to illustrate the wide pH range in which the oxidation reaction may be carried out. The results of these tests are set forth in Table IV below:

TABLE IV

| Example No.: | Percent protein | Chlorine treatment level, percent active chlorine | pH during oxidation | Percent batter adhesion |
| --- | --- | --- | --- | --- |
| 19 | 1.2 | 1.0 | 2.0 | 95 |
| 20 | 1.2 | 1.0 | 6.0–6.5 | 100 |
| 21 | 1.2 | 1.0 | 8.0–8.5 | 95 |
| 22 | 1.2 | 1.0 | 10.0–10.5 | 100 |

The protein of the starch can be adjusted with animal protein if desired as is illustrated in the following example:

EXAMPLE 23

Normal commercial starch was adjusted to 0.8 percent protein by weight starch by the addition of gelatin and then was oxidized in conventional manner by the addition of 0.6 percent active chlorine by weight of starch. The starch, when tested by the procedure in Example 1, has a batter adhesion of 98 percent. Tests made with varying levels of animal protein at various levels of oxidative treatment give similar results.

It will be understood that it is intended to cover all changes and modifications of the preferred embodiment of out invention herein chosen for the purpose of illustration which do not constitute departure from the spirit and scope of our invention.

What is claimed is:

1. The method of producing a battermix starch for foodstuffs with consistently better adhesion characteristics which comprises the steps of:
   a. adjusting the protein content of a starch other than a starch-containing cereal flour to at least about 0.7 percent by weight starch, and then
   b. oxidizing said starch with an edible, non-toxic oxidizing reagent.

2. The method of claim 1 wherein the oxidizing reagent is selected from the group consisting of hypochlorous acid and sodium hypochlorite.

3. The method of claim 1 wherein the oxidizing reagent is present in an amount up to about 8.0 percent by weight starch.

4. The method of claim 1 wherein the protein level is from about 0.7 percent to about 11 percent by weight starch.

5. The method of claim 1 wherein the starch is cornstarch.

6. The method of producing a battermix starch with consistently better adhesion characteristics which comprises the a battermix of:

a. adjusting the protein level of a starch other than a starch-containing cereal flour to about 0.7 to 11 percent by weight of starch, and
b. oxidizing said starch with up to about 8 percent by weight of starch of a compound selected from the group consisting of sodium hypochlorite and hypochlorous acid.

* * * * *